US012603771B1

(12) United States Patent
Sehrawat et al.

(10) Patent No.: US 12,603,771 B1
(45) Date of Patent: Apr. 14, 2026

(54) DISTRIBUTED KEY GENERATION AND RESHARING FOR MULTI-DEVICE CRYPTOCURRENCY WALLETS WITH TEE-BACKED SECURITY

(71) Applicant: Circle Internet Group, Inc., Boston, MA (US)

(72) Inventors: Vipin Singh Sehrawat, Fremont, CA (US); Nolan Miranda, Boston, MA (US)

(73) Assignee: Circle Internet Group, Inc., Boston, MA (US)

( * ) Notice: Subject to any disclaimer, the term of this patent is extended or adjusted under 35 U.S.C. 154(b) by 0 days.

(21) Appl. No.: 18/913,269

(22) Filed: Oct. 11, 2024

(51) Int. Cl.
| | |
|---|---|
| *H04L 9/00* | (2022.01) |
| *G06F 21/00* | (2013.01) |
| *G06F 21/60* | (2013.01) |
| *G06Q 20/36* | (2012.01) |
| *H04L 9/08* | (2006.01) |
| *H04L 9/32* | (2006.01) |

(52) U.S. Cl.
CPC ............ *H04L 9/0877* (2013.01); *H04L 9/085* (2013.01); *H04L 9/3247* (2013.01); *H04L 9/50* (2022.05); *G06F 21/00* (2013.01); *G06F 21/60* (2013.01); *G06F 21/602* (2013.01); *G06Q 20/36* (2013.01); *G06Q 20/3674* (2013.01); *H04L 9/08* (2013.01); *H04L 9/0861* (2013.01); *H04L 2209/56* (2013.01)

(58) Field of Classification Search
CPC ....... H04L 9/08; H04L 9/0861; H04L 9/0877;
H04L 9/085; H04L 9/3247; H04L 9/50;
G06Q 20/36; G06Q 20/3674; G06F
21/00; G06F 21/60; G06F 21/602
See application file for complete search history.

(56) References Cited

U.S. PATENT DOCUMENTS

| | | | |
|---|---|---|---|
| 12,143,477 B2* | 11/2024 | Ferguson | .................. H04L 9/50 |
| 2020/0074450 A1* | 3/2020 | Fletcher | .............. G06Q 20/389 |
| 2021/0152371 A1* | 5/2021 | Fletcher | .............. H04L 9/3066 |
| 2024/0388442 A1* | 11/2024 | Zyskind | .................... H04L 9/50 |

OTHER PUBLICATIONS

"Efficient Online-Friendly Two-Party ECDSA Signature"—2021 SCM SIGSAC Conference on Computer and Communications Security, Nov. 13, 2021 https://haiyangxc.github.io/hyxue/paper-doc/XAX21.pdf (Year: 2021).*
"Round-Optimal, Fully Secure Distributed Key Generated"—Crypto 2024, International Cryptography Conference, Aug. 18, 2024 https://cysec.wien/news/2025-03-04_lecture_katz/TU_Wien_Round_Optimal_DKG.pdf (Year: 2024).*
Battagliola, et al., "Threshold ECDSA with an Offline Recovery Party," Mediterranean Journal of Mathematics, 2022, available online Nov. 22, 2021, 19(4), 29 pages.

(Continued)

*Primary Examiner* — Randy A Scott
(74) *Attorney, Agent, or Firm* — Fish & Richardson P.C.

(57) ABSTRACT

Implementations of the present disclosure are directed to star distributed key generation (SDKG) between computing devices for private key sharing in cryptographic networks, where a computing device is the center of a star graph of multiple computing devices and functions as a 2-out-of-3 DKG protocol that can is robust against multiple types of corruptions.

8 Claims, 3 Drawing Sheets

(56)     References Cited

OTHER PUBLICATIONS

Döttling et al., "TinyOLE: Efficient Actively Secure Two-Party Computation from Oblivious Linear Function Evaluation," CCS '17: Proceedings of the 2017 ACM SIGSAC Conference on Computer and Communications Security, Oct. 30, 2017, pp. 2263-2276.

Katz, "Round-Optimal, Fully Secure Distributed Key Generation," Advances in Cryptology—CRYPTO 2024: 44th Annual International Cryptology Conference, Aug. 18, 2024, 31 pages.

Roy, "SoftSpokenOT: Quieter OT Extension from Small-Field Silent VOLE in the Minicrypt Model," Advances in Cryptology—CRYPTO 2022: 42nd Annual International Cryptology Conference, CRYPTO 2022, Proceedings, Part I, Aug. 15, 2022, pp. 655-685.

Xue et al., "Efficient Online-friendly Two-Party ECDSA Signature," CCS '21: Proceedings of the 2021 ACM SIGSAC Conference on Computer and Communications Security, Nov. 13, 2021, 16 pages.

* cited by examiner

*300*

Generate first set of key share sub-parameters *302*

Securely store second sub-set of key share sub-parameters *304*

Transmit first key share sub-parameter in the first sub-set of key share sub-parameters and a first set of verification parameters *306*

Receive parameter set *308*

Determine first private key share *310*

DISTRIBUTED KEY GENERATION AND RESHARING FOR MULTI-DEVICE CRYPTOCURRENCY WALLETS WITH TEE-BACKED SECURITY

TECHNICAL FIELD

This specification relates generally to distributed key generation and more particularly to distributed key generation for improved security and technical efficiency in cryptographic networks.

BACKGROUND

Cryptographic networks enable entities (e.g., enterprise, users) to securely exchange electronic communications. For example, cryptographic networks can use public-key cryptography to enable encrypted communications to be exchanged between entities. In general, public-key cryptography uses key-pairs that are generated using a cryptographic algorithm (e.g., using cryptographic pseudorandom number generators (CPRNG)), each key-pair including a public key and a private key. Each entity is assigned its own key-pair, where the public key is available to one or more other entities and the private key is held confidential to the respective entity.

In securing communications, entities use keys to encrypt information contained in exchanged messages. The information can be encrypted using asymmetric key encryption, which can include a sending entity using the public key of a receiving entity to encrypt information, which can only be decrypted using the private key of the receiving entity. As such, security is achieved through secrecy of the private key of the receiving entity. That is, any entity that has access to the private key of the receiving entity is able to decrypt the information.

To enhance security, techniques such as multi-party computation (MPC) and threshold signature schemes, have been introduced. MPC enables multiple entities to evaluate a computation without revealing any private data held by each entity. A threshold signature scheme (TSS) enables multiple entities to collectively sign publicly visible information without requiring a private key. Instead, in TSS, parties only compute with their respective private key share of the private key. That is, a threshold number of entities must participate to sign. In TSS, no single entity knows the private key. Instead, each entity knows the public key (shared public key) and holds an individual secret key share that is a share (portion) of the private key (shared private key). In TSS, each entity generates a partial signature and the partial signatures are aggregated to provide a final signature for the encrypted information. For TSS, distributed key generation (DKG) enables multiple entities to participate in generation of the key-pair. Through DKG, the shared public key is generated, which can be known to all entities, and multiple shares of a private key are generated, each share of the private entity only being known to a respective entity of the multiple entities.

SUMMARY

This specification describes systems, methods, devices, and other techniques relating to distributed key generation for improved security and technical efficiency in cryptographic networks. More particularly, implementations of the present disclosure are directed to star distributed key generation (SDKG) between computing devices for private key sharing in cryptographic networks.

In general, innovative aspects of the subject matter described in this specification can include actions of generating, by a first computing device of a first entity, a first set of key share sub-parameters, a first sub-set of key share sub-parameters generated using a first function, a second sub-set of key share sub-parameters being generated by sampling from a sampling space, securely storing the second sub-set of key share sub-parameters by encrypting the second sub-set of key share sub-parameters using a first encryption key to provide an encrypted second sub-set of key share sub-parameters, transmitting, by the first computing device and to a second computing device of a second entity, a first key share sub-parameter in the first sub-set of key share sub-parameters and a first set of verification parameters, receiving, by the first computing device and from the second computing device, a parameter set including a key share sub-parameter generated by the second computing device using a second function and a second set of verification parameters, and determining, by the first computing device, a first private key share that enables the first computing device to sign transactions associated with the second computing device within the cryptographic network. Other implementations of this aspect include corresponding systems, apparatus, and computer programs, configured to perform the actions of the methods, encoded on computer storage devices.

These and other implementations can each optionally include one or more of the following features: the encrypted second sub-set of key share sub-parameters is stored within a first trusted execution environment (TEE) of the first computing device; the first encryption key is an Advanced Encryption Standard (AES) encryption key that is generated by the first TEE of the first computing device; neither the second sub-set of key share sub-parameters nor the encrypted second sub-set of key share sub-parameters is shared by the first computing device within any other computing device during execution of the SDKG; actions further include determining, by the first computing device, a second private key share that enables the first computing device to sign transactions associated with a third computing device within the cryptographic network; the first computing device determines the second private key share at least partly in response to authenticating the third computing device based on information that the second computing device shared with the third computing device; the parameter set is received by the first computing device at least partly in response to the second computing device verifying verification parameters of the first set of verification parameters; the second computing device securely stores the fourth sub-set of key share sub-parameters and at least one key share sub-parameter of the third sub-set of key share sub-parameters by encryption using a second encryption key to provide an encrypted sub-set of the second set of key share sub-parameters; the second encryption key is an AES encryption key that is generated by a second TEE of the second computing device; and the cryptographic network is a cryptocurrency network and the first entity is a minting entity that mints tokens of a cryptocurrency within the cryptocurrency network.

The present disclosure also provides a non-transitory computer-readable storage medium coupled to one or more processors and having instructions stored thereon which, when executed by the one or more processors, cause the one or more processors to perform operations in accordance with implementations provided herein.

It is appreciated that the methods and systems in accordance with the present disclosure can include any combination of the aspects and features described herein. That is, methods and systems in accordance with the present disclosure are not limited to the combinations of aspects and features specifically described herein, but also include any combination of the aspects and features provided.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
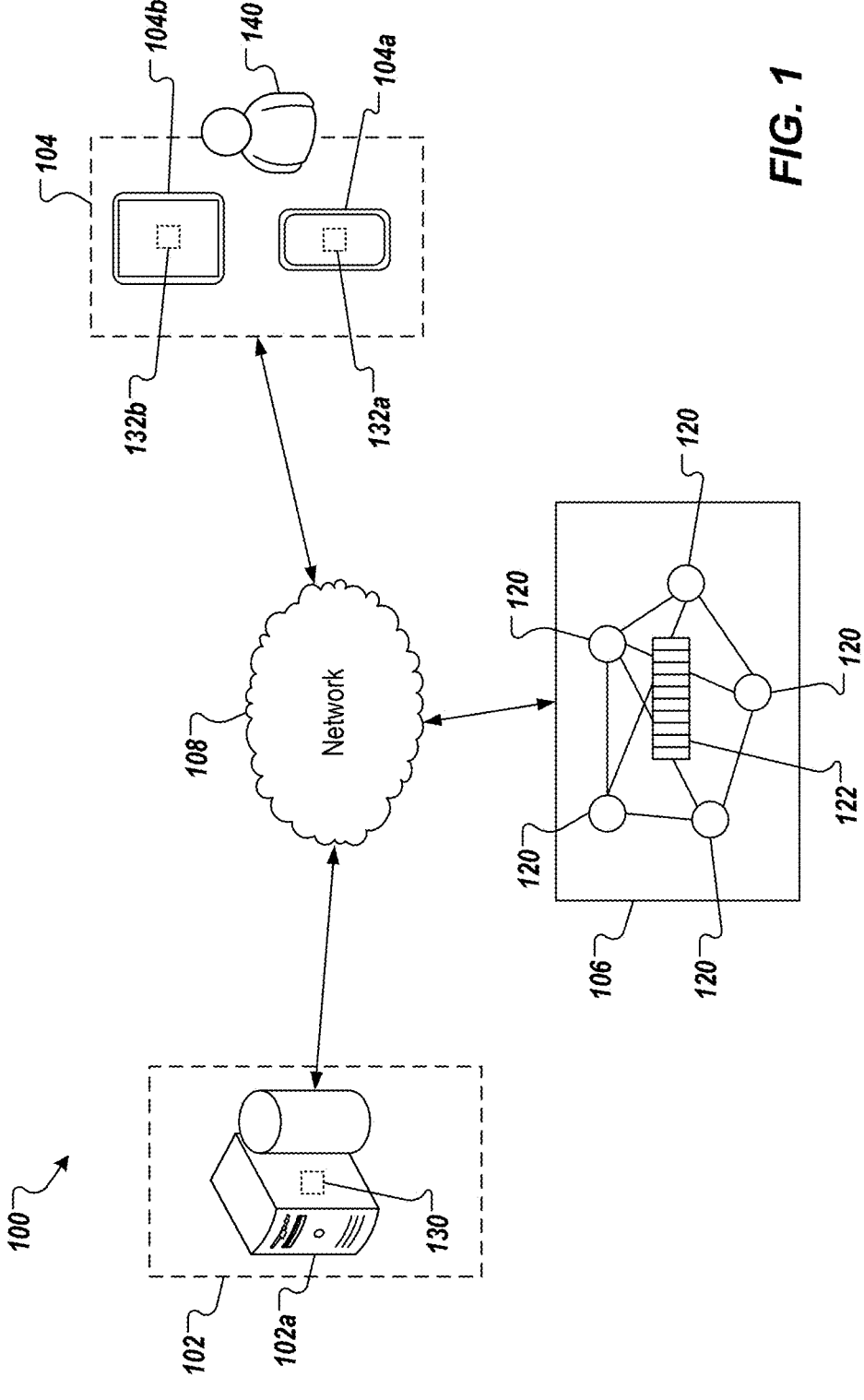
FIG. 1 is a conceptual architecture in accordance with implementations of the present disclosure.

The technology of this patent application is directed to distributed key generation for improved security and technical efficiency in cryptographic networks. More particularly, implementations of the present disclosure are directed to a star distributed key generation (SDKG) between computing devices for private key sharing in cryptographic networks.

In some implementations, actions include generating, by a first computing device of a first entity, a first set of key share sub-parameters, a first sub-set of key share sub-parameters generated using a first function, a second sub-set of key share sub-parameters being generated by sampling from a sampling space, securely storing the second sub-set of key share sub-parameters by encrypting the second sub-set of key share sub-parameters using a first encryption key to provide an encrypted second sub-set of key share sub-parameters, transmitting, by the first computing device and to a second computing device of a second entity, a first key share sub-parameter in the first sub-set of key share sub-parameters and a first set of verification parameters, receiving, by the first computing device and from the second computing device, a parameter set including a key share sub-parameter generated by the second computing device using a second function and a second set of verification parameters, and determining, by the first computing device, a first private key share that enables the first computing device to sign transactions associated with the second computing device within the cryptographic network.

To provide context for the subject matter of the present disclosure, and as introduced above, cryptographic networks enable entities (e.g., enterprise, users) to securely exchange electronic communications. For example, cryptographic networks can use public-key cryptography to enable encrypted communications to be exchanged between entities. In general, public-key cryptography uses key-pairs that are generated using a cryptographic algorithm (e.g., using cryptographic pseudorandom number generators (CPRNG)), each key-pair including a public key and a private key. Each entity is assigned its own key-pair, where the public key is available to one or more other entities and the private key is held confidential to the respective entity.

In securing communications, entities use keys to encrypt information contained in exchanged messages. The information can be encrypted using asymmetric key encryption, which can include a sending entity using the public key of a receiving entity to encrypt information, which can only be decrypted using the private key of the receiving entity. As such, security is achieved through secrecy of the private key of the receiving entity. That is, any entity that has access to the private key of the receiving entity is able to decrypt the information.

To enhance security, techniques such as multi-party computation (MPC) and threshold signature schemes, have been introduced. MPC enables multiple entities to evaluate a computation without revealing any private data held by each entity. A threshold signature scheme (TSS) enables multiple entities to collectively sign publicly viewable information. That is, a threshold number of entities must participate to sign the information. Typical approaches use a 2-out-of-3 threshold, meaning that at least two of three entities are needed to participate. In TSS, no single entity knows the private key. Instead, each entity knows the public key (shared public key) and holds an individual secret key share that is a share (portion) of the private key (shared private key). In TSS, each entity generates a partial signature and the partial signatures are aggregated to provide a final signature for the encrypted information. For TSS, distributed key generation (DKG) enables multiple entities to participate in generation of the key-pair. Through DKG, the shared public key is generated, which can be known to all entities, and multiple shares of a private key, referred to as private key shares, are generated, each private key share only being known to a respective entity of the multiple entities.

To further enhance security, each of the entities can execute computations and store data within a trusted execution environment (TEE). At a high-level, a TEE is a trusted environment within hardware (one or more processors, memory) that is isolated from the hardware's operating environment (e.g., operating system (OS), basic input/output system (BIOS)). In further detail, a TEE is a separate, secure area of a processor that ensures the confidentiality, and integrity of code executing, and data loaded within the main processor. Within a processor, the TEE runs in parallel with the OS. At least portions of so-called trusted applications (TAs) execute within the TEE and have access to the processor and memory of the TEE. Through the TEE, the TAs are protected from other applications running in the main OS. Further, the TEE cryptographically isolates TAs from one another within the TEE. In the context of the present disclosure, one or more TAs can be provided to execute DKG, MPC, and TSS, among other cryptographic techniques.

Using TEEs provides multiple benefits in terms of security. For example, the TEE protects key shares (i.e., a share of a shared private key) from a wide range of attacks, such as physical attacks and software exploits. Further, key share operations are isolated within the TEE, which significantly reduces attack surfaces compared to traditional software-only approaches. For instance, TEEs ensure that the key share is never exposed outside during its generation and/or usage when generating signatures. Hence, using TEEs enables better isolation and protection, secure key generation, storage and handling, and secure signature generation. An example of a TEE includes Software Guard Extensions (SGX) provided by Intel Corporation of Santa Clara, California, United States. It is contemplated, however, that implementations of the present disclosure can be realized using any appropriate TEE.

In some use cases, users (entities) further seek to enhance security through multi-device support, in which a user can use multiple devices for transacting within a cryptographic network, each device having a TEE provided therein. An example use case, which is discussed in further detail herein, is in cryptocurrency networks. In such use cases, access to the private key of the user (the private key share in the case of TSS) is critical. For example, in cryptocurrency networks, if a user loses their private key/private key share, the user loses access to their cryptocurrency. If a malicious entity (e.g., hacker) obtains access to the private key/private key share of the user, the malicious entity can pose as the user to perform malicious transactions (e.g., steal cryptocurrency from the user). Use of multiple devices provides additional layers of security in terms of providing redundant private keys/private key shares. For example, if a user loses one device and, thus, the private key/private key share thereon, the user can use the private key/private key share of another device.

However, traditional approaches to TEE-backed security with multi-device support suffer various disadvantages from both technical and security perspectives. For example, instead of a 2-out-of-3 threshold for TSS, traditional approaches can require a 3-out-of-3 threshold, where two private key shares are generated and stored on nodes (within servers) of an entity (e.g., a provider of a cryptocurrency, which can be referred to as a minting entity), the nodes being hosted within a cloud computing platform (e.g., Amazon Web Services (AWS)), and a third private key share is stored on a device of a user. Raising to the 3-out-of-3 threshold results in more complex signatures, as an additional private key share needs to be accounted for, as compared to the 2-out-of-3 threshold. Another disadvantage is that, if a user would like to register another device for redundancy of private key shares, multiple communication rounds are required between the three nodes that hold the initially provided private key shares (e.g., two nodes of the minting entity, a device (node) of the user).

Traditional approaches, such as that discussed above, have negative impacts on technical efficiency and security. For example, the traditional approach requires additional interactions between nodes resulting in expenditure of technical resources (e.g., processors, memory, bandwidth) and exposing attack surfaces. As another example, the nodes of the minting entity rely on security practices of the third-party that provisions the cloud platform. For example, if nodes of a minting entity are hosted by Amazon Web Services (AWS), the minting entity has to rely on the security practices of AWS.

In view of the foregoing, implementations of the present disclosure provide a SDKG protocol ($\pi_{SDKG}$) between computing devices for private key sharing in cryptographic networks. As described in further detail herein, the SDKG protocol of the present disclosure overcomes deficiencies of traditional approaches to private key sharing with multi-device support. The SDKG protocol of the present disclosure takes place between a first device $P_1$ (e.g., a minting entity) and respective devices $P_2$, $P_3$ of a second entity (e.g., a user that transacts tokens minted by the minting entity). It can occur that one of the devices $P_2$, $P_3$ can be malicious (e.g., compromised by a hacker). The minimal authorized subsets for the SDKG protocol are $\{P_1, P_2\}$ and $\{P_1, P_3\}$ (in particular, not $\{P_2, P_3\}$).

Accordingly, implementations of the present disclosure realize a star access structure with $P_1$ as the center of the graph. This means that, although the SDKG protocol is meant to be a 2-out-of-3 DKG protocol, it can allow one of the following corruptions: $\{P_1\}$, $\{P_2\}$, $\{P_3\}$, $\{P_2, P_3\}$. This provides improved flexibility over existing 2-out-of-2 DKG and TSS protocols, as each only allows one of the following corruptions: $\{P_1\}$, $\{P_2\}$, $\{P_3\}$. Further, the SDKG protocol of the present disclosure is more restrictive than existing 2-out-of-3 TSS implementations, because the center of the star graph, defining the access structure, is essential for correct DKG and threshold signing. Therefore, by realizing a star access structure, the SDKG protocol of the present disclosure increases both security and robustness against corruption.

Implementations of the present disclosure are described in further detail with non-limiting reference to an example use case. The example use case includes a cryptographic network that enables generation and storage of, and transactions related to digital assets, such as cryptocurrencies. For example, a cryptocurrency network can enable creation of tokens of a cryptocurrency that can be transferred between entities through transactions. In such cryptocurrency networks, transactions (e.g., creation, transfer) are immutably recorded in a distributed ledger, commonly referred to as a blockchain. While cryptocurrency networks are referenced herein, it is contemplated that implementations of the present disclosure can be realized for any appropriate cryptographic network for any appropriate use case.

With regard to cryptocurrency networks, users (entities) can hold digital assets as stores of value and mediums of exchange. In general, a digital asset can be described as a virtual store of value that leverages a peer-to-peer network to store, record, and validate transactions. A provider (entity) of the digital asset generates (which can be referred to as minting) tokens of the digital asset. The peer-to-peer network can maintain a distributed ledger (e.g., blockchain), which can be described as a decentralized database that immutably stores transactions across the peer-to-peer network. Example digital assets can include, without limitation, cryptocurrencies (e.g., stablecoins), non-fungible tokens (NFTs), security tokens, tokenized money market funds (T-MMF), and the like (e.g., government obligations).

Implementations of the present disclosure are described in further detail with non-limiting reference to cryptocurrency, among other digital assets. In some examples, a cryptocurrency can be described as a digital currency that uses cryptography to secure transactions that are recorded in the distributed ledger (e.g., blockchain). In some examples, a digital token (also referred to as a token) can be described as immutable, computer-readable code that represents an increment of a digital asset and is stored in the distributed ledger.

Implementations of the present disclosure are described in further detail herein with reference to example peer-to-peer networks (also referred to herein as chain networks and/or cryptocurrency networks), each maintaining a respective chain (distributed ledger, blockchain). Some example peer-to-peer networks can each be described as an Ethereum-compatible network. Ethereum can be described as a decentralized computing infrastructure that executes a virtual machine, referred to as the Ethereum virtual machine (EVM), to execute transactions on a chain. The EVM can be described as a global singleton and operates as a single-instance computer, globally across nodes of the peer-to-peer network. That is, each node in the network executes a local copy of the EVM to execute transactions on the chain. The chain of the peer-to-peer network records the changing state of the EVM as transactions are processed. While Ethereum is referenced herein for purposes of illustration, it is contemplated that implementations of the present disclosure can be realized using any appropriate peer-to-peer network (e.g., networks that provide on-chain computing; EVM-compatible chains). Example peer-to-peer networks can include, without limitation, Arbitrum, Avalanche, and Base, among several others, each of which is EVM-compatible. It is contemplated, however, that implementations of the present disclosure can be realized in peer-to-peer networks that are not EVM-compatible.

In general, tokens of a digital asset can be generated using a minting process. Minting can generally be described as generating tokens of a digital asset through execution of cryptographic transactions within a network and recording the transactions in a blockchain maintained within the network. In some examples, minting is executed through a minting function of a smart contract (minter) that is executed within the network. On the other hand, tokens of a cryptocurrency can be permanently removed from circulation within a network using a burning process. Burning can generally be described as permanently removing tokens of a cryptocurrency from circulation through execution of cryptographic transactions within a network and recording the transactions in a blockchain maintained within the network. In some examples, burning is executed through a burning function of a smart contract (burner) that is executed within the network. Smart contracts can be described as programs that are executed on-chain and are each provided as a collection of code (functions) and data (state) that resides at a specific address on the chain.

In some instances, a user (entity) can create an account with a provider of a cryptocurrency (e.g., an entity that mints tokens of a cryptocurrency). For example, the user can create an account with the provider of the cryptocurrency to enable the user to purchase tokens of the cryptocurrency. In some examples, creation of the account entails the generation of a key-pair that is used to cryptographically sign transactions within the cryptocurrency network. In some examples, the private key of the user is stored within a wallet of the user that is provisioned on a device of the user. For example, the private key, or the wallet itself, can be stored within a TEE of the device. In the context of TSS, a private key share is generated for the user by the TEE and is stored within the TEE. Further in the context of TSS, a private key share is generated for the minting entity by a TEE of a device (e.g., server) and is stored within the TEE of that device.

FIG. 1 depicts an example environment 100 that can be used to execute implementations of the present disclosure. In some examples, the example environment 100 enables entities to participate in a cryptographic network for secure communications. The example environment 100 includes a provider system 102, a user system 104, a cryptographic network 106, and a network 108. In some examples, the network 108 includes a local area network (LAN), wide area network (WAN), the Internet, or a combination thereof, and connects web sites, user devices (e.g., computing devices), and back-end systems. In some examples, the network 108 can be accessed over a wired and/or a wireless communications link.

In the example use case, the cryptographic network 106 can be provided as a cryptocurrency network that enables a provider of a cryptocurrency (referred to herein as a minting entity) to distribute tokens of a cryptocurrency to users and that enables users to execute transactions related to the cryptocurrency. The cryptographic network 106 can be described as a peer-to-peer network of nodes 120 and transactions related to the cryptocurrency are immutably stored within a blockchain 122. For example, the blockchain 122 is a distributed ledger that is updated and stored across multiple nodes within the cryptographic network 106. Although the cryptographic network 106 is depicted separately from the network 108, it is contemplated that at least a portion of the cryptographic network 106 can be provided within the network 108 (e.g., as nodes that are distributed across the Internet).

In the depicted example, the provider system 102 includes a computing device 102a, which can, for example, represent one or more servers. In some examples, the computing device 102a is operated by a minting entity to mint tokens of a cryptocurrency and distribute tokens to users, as well as execute transactions. Actions executed by the minting entity are recorded in the blockchain 122 of the cryptographic network 106. In some examples, the computing device 102a can function as a node of the cryptographic network 106. In the example of FIG. 1, the computing device 102a includes a TEE 130.

In the depicted example, the user system 104 includes computing devices 104a, 104b. In some examples, the computing devices 104a, 104b can include, without limitation, a server, a desktop computer, a laptop computer, a tablet computing device, and a smartphone. In the example of FIG. 1, the computing device 104a includes a TEE 132a and the computing device 104b includes a TEE 132b. In some implementations, a user 140 uses the device 104a to execute transactions within the cryptographic network 106, which transactions are immutably recorded in the blockchain 120 of the cryptographic network 106. Example transactions can include, without limitation, purchasing tokens of a cryptocurrency from the minting entity and transferring tokens of cryptocurrency with other users and/or the minting entity. As described in further detail herein, the user 140 can seek to add the device 104b to enhance security of private information of the user 140 (e.g., multi-device support).

In further detail and in accordance with implementations of the present disclosure, a TSS can be used to enable the user 140 to execute transactions within the cryptographic network 106. For TSS, an access structure $\Gamma$ can be defined. For example, a set of parties can be denoted as $P=\{P_1, \ldots, P_l\}$, where a collection $\Gamma \subseteq 2^P$ is monotone if $A \in \Gamma$ and $A \subseteq B$ imply that $B \in \Gamma$. The access structure, provided as $\Gamma \subseteq 2^P$, is a monotone collection of non-empty subsets of P. Sets in $\Gamma$ are called authorized to participate in cryptographic transactions and sets not in $\Gamma$ are called unauthorized to participate in cryptographic transactions. If $\Gamma$ consists of all subsets of P with size greater than or equal to a fixed threshold t ($1 \leq t \leq l$), then $\Gamma$ is called a t-threshold access structure.

For the access structure $\Gamma$, a family of minimal authorized subsets $\Gamma_0 \in \Gamma$ is defined as:

$$\Gamma_0 = \{A \in \Gamma : B \subset A \text{ for all } B \in \Gamma \setminus \{A\}\}$$

Hence, the family of minimal access subsets $\Gamma_0$ uniquely determines the access structure $\Gamma$, and it holds that $\Gamma = cl(\Gamma_0)$, where cl denotes closure.

A hypergraph $H=(V, E)$ is said to be a hyperstar if the following conditions are met:

$$C = \cap_{E_i \in E} E_i \neq \emptyset,$$

for all i, there exists $v \in V$ such that $v \in E_i$ and $v \notin E_j$ for all $i \neq j$.

A star graph can be referred to as a 2-hyperstar, in that it holds for all $E_i \in E$ that $|E_i|=2$. A graph access structure for secret sharing between entities (e.g., the minting entity, the user 140) is denoted by a graph, such that only adjacent vertices can reconstruct the secret. Hence, for a (hyper)star graph, the at the center of the (hyper)star is part of all (minimal) authorized subsets.

In accordance with implementations of the present disclosure, a SDKG protocol is provided and supports a (hyper) star access structure with a first party $P_1$ as the center. In the context of the present disclosure, the first party $P_1$ can be the computing device 102a of the minting entity, which mints tokens of the cryptocurrency distributed across the cryptographic network 106. As such, the first party $P_1$ is indispensable for successful DKG (and signature generation).

As introduced above, in a two-party TSS, two parties each hold a private key share of a secret private key (e.g., for a cryptocurrency wallet). In the example of FIG. 1, a private key share can be held in the computing device 102a for the minting entity and a private key share can be held in the computing device 104a for the user 140. The security of the system relies on the fact that neither party can sign transactions independently. However, leakage of private key shares is a central threat. However, key sharing allows refreshing (resharing) of the key shares, such that the new private key shares can be generated and still correspond to the same private key and, hence, the same public key. Key sharing in a two-party TSS is crucial for maintaining both security and functionality. On a high-level, key sharing, which also include resharing, offers the following benefits:

1. Security: resharing prevents long-term exposure of key shares, reducing the risk of compromise over time.
2. Continuity: the wallet address remains the same, ensuring operational consistency for the user and any external systems relying on the wallet. This is crucial for maintaining consistency, especially when the wallet address, which is deterministically derived from the public key in a pseudorandom manner, is tied to significant assets or smart contracts that depend on it.
3. Risk Mitigation: even if a party's private key share is compromised, resharing renders that information obsolete before it can be used maliciously.

Unfortunately, due to the mutually distrusting and malicious majority model of two-party TSS, performing efficient key resharing has remained a challenging problem. For example, existing solutions for malicious settings rely on heavy protocols, such as MPC, fully homomorphic encryption, oblivious transfer, zero knowledge proofs, and verifiable random functions.

In view of this, implementations of the present disclosure provide key resharing that is relatively simple and computationally efficient for two-party threshold key generation and signing. More particularly, and as described in further detail herein, implementations of the present disclosure provide a SDKG protocol that enables computationally-efficient resharing of private key shares for a TSS (defined for a star access structure over 3 parties).

Figure 2:
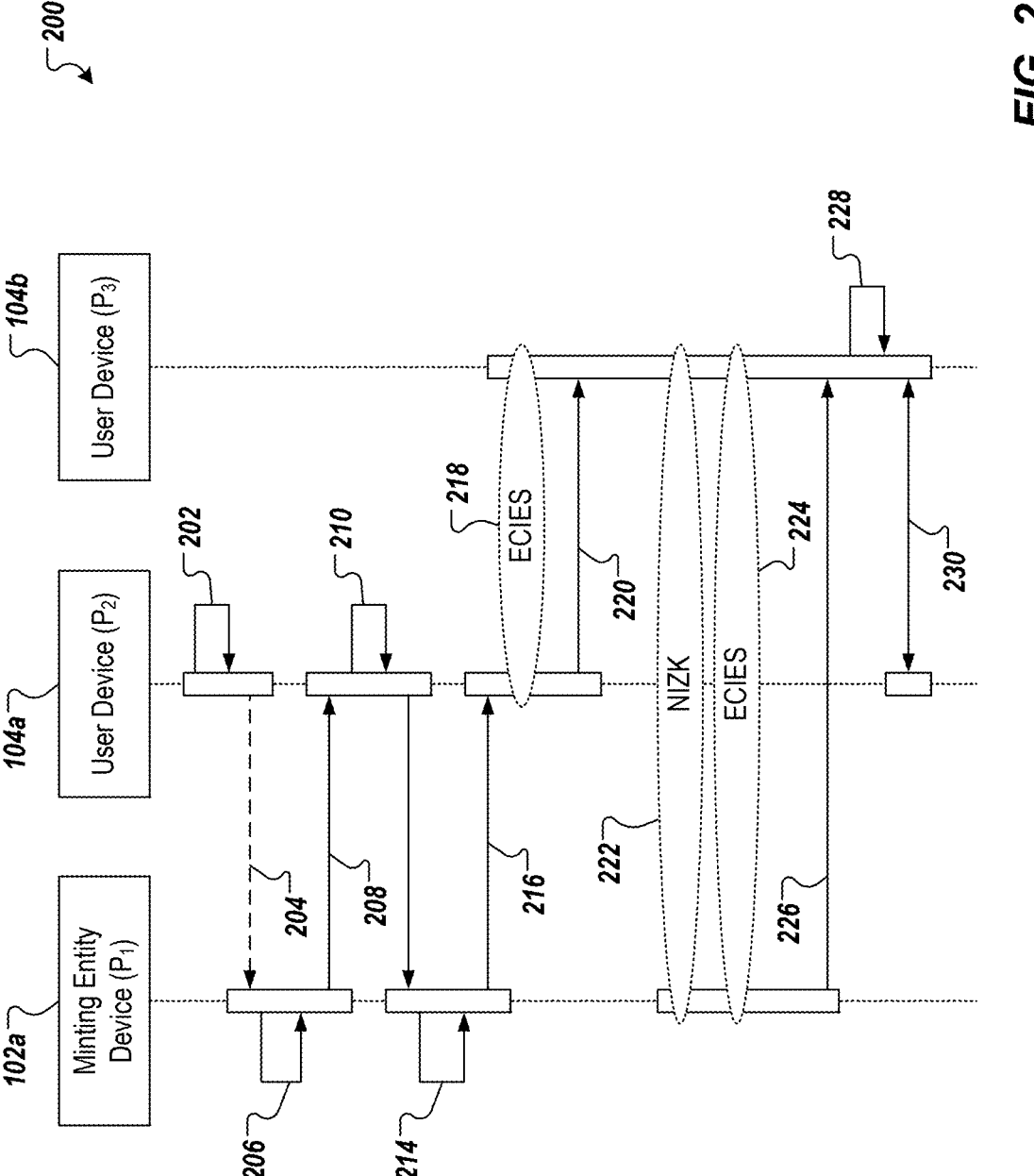
FIG. 2 is an example signal flow diagram in accordance with implementations of the present disclosure.

Implementations of the SDKG protocol of the present disclosure are described in further detail herein with reference to FIG. 2. Unless stated otherwise, all computations are performed modulo q. Also, it can be noted that communications between parties are encrypted communication using key pairs that had been generated before initiating the SDKG. For example, an authenticated encryption mechanism (e.g., AES-GCM) can be used to generate key pairs for the respective parties.

FIG. 2 is an example signal flow diagram 200 in accordance with implementations of the present disclosure. In the example of FIG. 2, the computing device 102a, the computing device 104a, and the computing device 104b are provided as a firsty party $P_1$, second party $P_2$, and third party $P_3$, respectively. The signal flow depicted in FIG. 2 represents a scenario, in which a shared key pair has already been generated as between the firsty party $P_1$ and the second party $P_2$, such that the firsty party $P_1$ and the second party $P_2$ each hold a respective private key share of a shared private key. In the example of FIG. 2, a private key share is to be provided to the third party $P_3$. For example, the user 140 can determine that the third party $P_3$ is to hold a private key share for redundancy (e.g., if the second party $P_2$) is compromised. As another example, the user 140 can determine that the third party $P_3$ that has already held a private key share had been compromised and, as such, the user 140 has wiped the third party $P_3$ and seeks to again reshare a private key share.

In some implementations, the second party $P_2$ initiates the SDKG and begins by executing (202) operations. For example, the second party $P_2$ samples $u_2$ $\$\leftarrow Z_{pq}$. For example, for suitable prime q, it can be assumed assume that $E(\mathbb{F}_q)$ denotes an elliptic curve over a finite field $\mathbb{F}_q$, and $G \subseteq E(\mathbb{F}_q)$ is the elliptic curve group of prime order, p, where the discrete logarithm problem is hard. Here, G can be its publicly known base/generator point and O be the identity element. Unless stated otherwise, all computations are performed modulo q.

The second party $P_2$ generates a commitment $C_2$=Com $(u_2G)$. In some examples, the second party $P_2$ (optionally) sends (204) $C_2$ to the first party $P_1$. The first party $P_1$ executes (206) multiple operations. For example, the first party $P_1$ samples $u_1\$\leftarrow Z_p$, $\sigma_{3,1}$, $b_1$ $\$\leftarrow Z_q$ and generates $f_1(x)=u_1+b_1x$. The first party $P_1$ computes $\sigma_{1,1}=f_1(2)$, $\sigma_{1,2}=f_1(3)$, and $\sigma_{1,3}=f_1(1)$. The first party $P_1$ computes $Rec_1=\sigma_{3,1}$ and saves it securely. In some examples, security can be based on the integrity of the TEE 130, where the first party $P_1$ can securely save as $Rec_1=AES_{\varkappa_1}(\sigma_{3,1})$, where $\varkappa_1$ is an AES key generated and managed by the TEE 130 of the first party $P_1$. The first party $P_1$ sends (208) $\sigma_{1,2}$, $b_1G$, and $u_1G$ to the second party $P_2$.

The second party $P_2$ executes (210) multiple operations. For example, the second party $P_2$ verifies that $\sigma_{1,2}G-3b_1G=u_1G$. If $\sigma_{1,2}G-3b_1G\neq u_1G$, an error is flagged and the DKG process is terminated. If $\sigma_{1,2}G-3b_1G=u_1G$, the second party $P_2$ samples $b_2$, $\sigma_{3,2}\$\leftarrow Z_q$ and generates $f_2(x)=u_2+b_2x$. The second party $P_2$ computes $\sigma_{2,1}=f_2(2)$, $\sigma_{2,2}=f_2(3)$, $\sigma_{2,3}=f_2(1)$, and $Rec_2=AES_{\varkappa_2}(\sigma_{3,2}, \sigma_{2,3})$, where $\varkappa_2$ is an AES key generated and managed by the TEE 132a of the second party $P_2$. The second party $P_2$ computes a private key share parameter $x_2=\sigma_{1,2}+\sigma_{2,2}+\sigma_{3,2}$ and generates a proof $\Delta_2$ for its knowledge of $x_2$. In some examples, the proof $\Delta_2$ is generated using a protocol, such as a non-interactive zero-knowledge (NIZK) protocol and can be provided as a SS-WE (simulation-sound weakly-extractable) NIZK proof. In general, a NIZK protocol enables a party (prover) to generate a proof that can be verified by another party (verifier) without further interaction between the parties, and a SS-WE NIZK proof can be described as a proof that is generated using the SS-WE NIZK protocol. The SS-WE NIZK proof can be described as a witness-indistinguishable proof that enables a prover to prove that a statement is true to a verifier without reveling which witness the prover has used to the verifier. An example of a NIZK protocol is described in further detail herein. The second party $P_2$ sends (212) $\Delta_2$, $x_2G$, $\sigma_{2,1}$, $b_2G$, $Rec_2$, $DeCom(C_2)$, and $u_2G$ to the first party $P_1$, where DeCom denotes a decommitment string.

The first party $P_1$ executes (214) multiple operations. For example, the first party $P_1$ the verifies the correctness of $\Delta_2$ and the consistency of $C_2$, $DeCom(C_2)$, and $u_2G$. For example, consistency verification can be performed based on a non-interactive weakly-extractable (NI-WE) commitment scheme, which is used to generate and verify the commitment, and correctness verification can be performed using a simulation-sound weakly-extractable (SS-WE) NIZK proof. In general, commitment schemes, take a message m (e.g., the message from the second party $P_2$ to the first party $P_1$) as an input and produces a commitment c (e.g., DeCom) for a verifier (e.g., the first party $P_1$), which can execute an efficient algorithm to determine whether m uniquely corresponds to c.

In general, the NI-WE commitment scheme should be binding and hiding as required from all commitment schemes. In addition to that, the NI-WE commitment scheme must guarantee that if a (malicious) prover issues a commitment, then it must know the committed value, which essentially means that the prover cannot issue false or random commitments without generating them properly, according to the NI-WE scheme. This means that the underlying cryptography binds the prover to the knowledge of the committed value. This property is referred to as weak-extractability. Also, SS-WE NIZKs are non-interactive zero-knowledge proof systems that, in addition to being zero-knowledge and sound, which holds for all NIZKs, are also simulation-sound and weakly-extractable. The latter term is defined exactly how it was defined for NI-WE commitments. For example, SS-WE NIZKs are built upon NI-WE commitments. Simulation-soundness means that a malicious party cannot generate distinct valid proofs for the same commitment and different witnesses (i.e., committed values).

Referring again to FIG. 2, if $C_2$, DeCom($C_2$), and $u_2G$ are not consistent, an error is flagged and the SDKG process is terminated. If $C_2$, DeCom($C_2$), and $u_2G$ are consistent, the first party $P_1$ verifies that $\sigma_{2,1}G-2b_2G=u_2G$. If $\sigma_{2,1}G-2b_2G\neq u_2G$, an error is flagged and the SDKG process terminates. If $\sigma_{2,1}G-2b_2G=u_2G$, the first party $P_1$ computes a private key share parameter $x_1=\sigma_{1,1}+\sigma_{2,1}+\sigma_{3,1}=f_1(2)+f_2(2)+\sigma_{3,1}$. The first party $P_1$ generates a SS-WE NIZK proof, $\Delta_1$, proving its knowledge of $x_1$. The first party $P_1$ sends (216) $\Delta_1$, $x_1G$ to the second party $P_2$, which verifies the correctness of $\Delta_1$.

The public key is $Y=3x_1G-2x_2G=(u_1+u_2+3\sigma_{3,1}-2\sigma_{3,2})G$. The private key share of the second party $P_2$, which is generated by the second party $P_2$, is $k_2=-2x_2$. The private key share of the first party $P_1$, which is generated by the first party $P_1$ for signing transactions with the second party $P_2$, is $k_{1,2}=3x_1$ and the private key share key share of the first party $P_1$, which is generated by the first party $P_1$ for signing transactions with the third party $P_3$, is $k_{1,3}=2\sigma_{1,3}-x_1$. Accordingly, the private key share of the third party $P_3$, which is later calculated by the third party $P_3$, as described below, is $k_3=2(\sigma_{2,3}-\sigma_{3,2})+4(\sigma_{3,1})$. For example, and as describe in further detail herein, whenever the third party $P_3$ wishes to register to execute transactions in the cryptographic network, the third party $P_3$ engages in the NIZK protocol described herein to retrieve $Rec_1$ and $Rec_2$ from the first party $P_1$, and thereafter extract $\sigma_{3,1}$, $\sigma_{2,3}$, $\sigma_{3,2}$, and compute $k_3$. It can be noted that $k_3$ can be only used by the third party $P_3$ for signing transactions with the first party $P_1$.

In some implementations, to add the third party $P_3$ as a new device for multi-device support, the second party $P_2$ uses a secure mechanism to share $x_2$ with the third party $P_3$. An example secure mechanism includes Elliptic Curve Integrated Encryption Scheme (ECIES). For example, the second party $P_2$ and the third party $P_3$ collectively execute (218) an ECIES process. Although ECIES is known in the art, a high-level discussion is provided herein.

In general, ECIES includes an encryption process, in which a sender (Alice) generates an ephemeral elliptic curve cryptography (ECC) key pair. Using a recipient's (Bob's) public key and Alice's ephemeral private key, Alice performs an Elliptic Curve Diffie-Hellman (ECDH) key agreement to create a shared secret. Alice uses a key derivation function (KDF) with the shared secret to derive symmetric encryption and message authentication code (MAC) keys. The message is encrypted using the derived encryption key and a MAC is computed on the ciphertext using the derived MAC key. Alice sends her ephemeral public key, the encrypted message, and the MAC to Bob. In a decryption process of ECIES, Bob receives Alice's ephemeral public key, the encrypted message, and the MAC, and uses his private key and Alice's ephemeral public key to perform ECDH and recreate the shared secret. Bob uses the KDF to derive the same encryption and MAC keys and verifies the MAC to ensure message integrity. If the MAC is valid, Bob decrypts the message using the derived encryption key.

After the third party $P_3$ has received $x_2$ from the second party $P_2$, the third party $P_3$ and the first party $P_1$ collectively execute (222) a NIZK protocol 222 to authenticate the third party $P_3$ to the first party $P_1$. In this manner, the third party $P_3$ can securely retrieve $\sigma_{3,1}$ and $Rec_2$.

Although NIZK protocols are known in the art, a high-level discussion of an example NIZK protocol is provided herein. In some implementations, the NIZK protocol can use G as a base point for a cyclic elliptic curve group, defined modulo q, which is a suitable, fixed, and public prime. All computations are performed in $Z_q$. The second party $P_2$ can hold a secret value $x_2\in Z_q$ and $\partial_2=x_2G$. The second party $P_2$ sends $\partial_2$ to the first party $P_1$, which saves $\partial_2$. At some later point, the second party $P_2$ uses ECIES to securely share $x_2$ with the third party $P_3$, as described above, which is a device that the second party $P_2$ trusts. The third party $P_3$ generates a random $r\in Z_q$ (let $R=rG$) and computes $c=Hash(R, \partial_2)$ and $\wp=r+cx_2$. The third party $P_3$ sends (R, $\wp$) to the first party $P_1$, which computes $c=Hash(R, \partial_2)$ and verifies $\wp G=R+c\partial_2$. If the test fails, then the first party $P_1$ rejects the third party $P_3$ as malicious. If the test passes, the first party $P_1$ accepts the third party $P_3$ as a trusted party. Security of the NIZK protocol follows trivially from discrete log and collision-resistance of the hash function, Hash.

Upon successful completion of the NIZK protocol, the first party $P_1$ trusts the third party $P_3$ and an ECIES process can be executed (224) as between the first party $P_1$ and the third party $P_3$. In this manner, a key pair can be generated that can be used to enable secure communication between the first party $P_1$ and the third party $P_3$. The first party $P_1$ sends (226) $\sigma_{3,1}$ and $Rec_2$ to the third party $P_3$. The third party $P_3$ executes (228) multiple operations. For example, the third party $P_3$ decrypts $Rec_2$ to retrieve $\sigma_{3,2}$ and $\sigma_{2,3}$ and can compute $k_3$ and securely import it inside its TEE. The first party $P_1$ and the third party $P_3$ exchange (230) proofs (e.g., SS-WE NIZK proofs) for their knowledge of $k_{1,3}$ and $k_3$, respectively.

It can be seen that $u_3G=3\sigma_{3,1}G-2\sigma_{3,2}G$ can be computed by the first party $P_1$ and the second party $P_2$, but neither can compute $u_3=3\sigma_{3,1}-2\sigma_{3,2}$. Hence, $Y=(f_1(0)+f_2(0)+f_3(0))G$ for $b_3=\sigma_{3,2}-\sigma_{3,1}$, such that $f_3(x)=u_3+b_3x$, which means that $\sigma_{3,2}=f_3(3)$ and $\sigma_{3,1}=f_3(2)$. Therefore, the combined shared private key becomes $f_1(0)+f_2(0)+f_3(0)$.

In view of the foregoing, it can be noted that either the first party $P_1$ or the second party $P_2$ can use $Rec_1$ and $Rec_2$, respectively, to perform key resharing/refresh with the same public and private keys. In some examples, it can occur that the second party $P_2$ does not share $Rec_2$ with the first party $P_1$. In such a scenario, the first party $P_1$ can initiate a key resharing procedure and securely send $\sigma_{3,1}$ to the second party $P_2$ and set its refreshed private key share as $k_1$, $=2\sigma_{1,3}-x_1$. Upon receiving $\sigma_{3,1}$, the second party $P_2$ securely retrieves $\sigma_{2,3}$ and $\sigma_{3,2}$, and computes its refreshed key share as $k_2$, $=2(\sigma_{2,3}-\sigma_{3,2})+4\sigma_{3,1}$. The correctness of the new keys follow trivially. It can be noted that the process is non-interactive, because the first party $P_1$ only sends one request to initiate the key refresh. Furthermore, verification of the updated key shares is also straightforward as any transactions signed with the updated private key shares must be verifiable with the same shared public key, which is known to all parties.

It can be shown that the SDKG protocol of the present disclosure is secure within the universal composability (UC) framework (i.e., is UC secure) in a random oracle model (ROM). UC can be described as a general-purpose model for the analysis of cryptographic protocols, which guarantees very strong security properties. In order to prove UC security of the SDKG protocol of the present disclosure, an ideal model for the SDKG protocol (ideal SDKG functionality $F_{SDKG}$) can be defined, which security can be evaluated against. For example, the ideal functionality of the SDKG protocol, $F_{SDKG}$, can be considered across initialization, key generation, key distribution, corruption handling, registration, and random oracle queries, and across a plurality of hybrids ( ), each hybrid representing one or more corruptions (e.g., maliciousness injected into the SDKG protocol). Example hybrids can include $H_0$ (ideal execution), $H_1$ (introducing real key shares), $H_2$ (revealing internal randomness upon corruption), $H_3$ (simulating communications and proofs), and $H_4$ (real protocol execution). As described in further detail in "UC-secure Distributed Key Generation for Multi-device Cryptocurrency Wallets with TEE-backed Security," Sehrawat et al., Oct. 11, 2024, which is incorporated herein by reference in the entirety for all purposes, it is shown that $H_0 \approx_c H_1 \approx_c H_2 \approx_c H_3 \approx_c H_4$. Thus, the SDKG protocol of the present disclosure UC-realizes $F_{DKG}$ in the ROM.

In some implementations, optimizations are provided for a 3-pass SDKG protocol of the present disclosure, in which the SDKG protocol involves 3 passes (messages) in total. It can be noted that most DKG schemes are 3-pass. Even though the SDKG protocol of the present disclosure addresses a much more complex access structure than traditional DKG protocols, optimizations can be made to the SDKG protocol. The optimizations can include using random oblivious linear evaluation (OLE) or vector OLE.

With regard to random OLE, and at a high-level, random OLE enables two parties to conduct an interactive setup phase to generate a pair of seeds $k_1$, $k_2 \in Z_{pq}$ (e.g., for $P_1$, $P_2$, respectively), such that $k_1$ can be expanded independently by $P_1$ to generate $u_1$, $c \in Z_{pq}$. Similarly, $k_2$ can be expanded by $P_2$ to generate $u_2$, $\Delta \in Z_{pq}$ such that $u_1 \Delta = c - u_2$. In order to make the SDKG protocol of the present disclosure round-optimal using random OLE, the following example updates can be made to the SDKG protocol, as described above:

1. A preprocessing/setup phase can be added, in which the parties perform an interactive protocol to generate n pairs of seeds $k_{1,i}$, $k_{2,i}$ ($i \in [n]$) for random OLE. An example is discussed in TinyOLE: Efficient actively secure two-party computation from oblivious linear function evaluation, Döttling et al. (2017).
2. The second party $P_2$ does not send $C_2$ to the first party $P_1$ (e.g., send (204) of FIG. 2). Instead, the second party $P_2$ and the first party $P_1$ expand their random OLE seeds non-interactively, allowing $P_1$ to generate $u_1$, c, and $P_2$ to generate $u_2 \Delta$. Then, for example, the second party $P_2$ can add $\Delta G$ to the message sent to the first party $P_1$ that includes $\Delta_2$, $x_2 G$, $\sigma_{2,1}$, $b_2 G$, $Rec_2$, $DeCom(C_2)$, and $u_2 G$ (e.g., send (212) of FIG. 2). That is, here, the second party $P_2$ can send $\Delta_2$, $x_2 G$, $\sigma_{2,1}$, $b_2 G$, $Rec_2$, $DeCom(C_2)$, $u_2 G$, and $\Delta G$ to the first party $P_1$.
3. The first party $P_1$ verifies that $u_1 \Delta G = cG - u_2 G$.

All elements (i.e., $u_1$, $u_2$, $\Delta$, c) are (pseudo)random, hence, the name random OLE. The security follows from that of random OLE and hardness of the discrete log problem on elliptic curves. In the example use case of cryptocurrency, the first party $P_1$ (the minting entity) can pre-decide with the second party $P_2$ (and/or the third party $P_3$) the number of wallets, n, allowed to be owned and, accordingly, generate n pairs of random OLE seeds $k_{1,i}$, $k_{2,i}$ ($i \in [n]$).

With regard to vector OLE, and at a high-level, vector OLE enables two parties to conduct an interactive setup phase to generate pair of seeds $k_1$, $k_2$ (for $P_1$, $P_2$, respectively), which can be expanded in a non-interactive manner by the first party $P_1$ to generate $u_1$, c and by the second party $P_2$ to generate $u_2$, $\Delta$ such that $u_1 \Delta = c - u_2$. Here, bold is used to indicate vectors. It can be noted that, for vector OLE, the expansion ratio can reach relatively high levels (e.g., in the range of 128× to 256× or even higher). Hence, for every single unit of data communicated in the preprocessing phase, the DKG protocol can expand it to generate 128 to 256 units of correlated randomness during a silent phase. In the example use case of cryptocurrency, this means that the user can spawn virtually limitless number of wallets in one go with a lightweight, interactive setup phase. In order to make the SDKG protocol of the present disclosure round-optimal using vector OLE, the following example updates can be made to the SDKG protocol, as described above:

1. Add a preprocessing/setup phase, during which the parties perform an interactive protocol to generate a pair of seeds $k_1$, $k_2$ for vector OLE. An example is discussed in SoftSpokenOT: Quieter OT Extension from Small-Field Silent VOLE in the Minicrypt Model, Roy (2022).
2. The second party $P_2$ does not send $C_2$ to the first party $P_1$ (e.g., send (204) of FIG. 2). Instead, the second party $P_2$ and the first party $P_1$ non-interactively expand their respective vector OLE seeds. For example, the second party $P_2$ can add cG to the message sent to the first party $P_1$ that includes $\Delta_2$, $x_2 G$, $\sigma_{2,1}$, $b_2 G$, $Rec_2$, $DeCom(C_2)$, and $u_2 G$ (e.g., send (212) of FIG. 2). That is, here, the second party $P_2$ can send $\Delta_2$, $x_2 G$, $\sigma_{2,1}$, $b_2 G$, $Rec_2$, $DeCom(C_2)$, $u_2 G$, and cG to the first party $P_1$.
3. The first party $P_1$ verifies that $u_1 \Delta G = cG - u_2 G$, which is a single step that verifies d pairs of parameters, $u_1$, $u_2 \in Z_q$, where $u_1$, $u_2 \in Z_{pq}^d$.

In some implementations, a modified SDKG protocol can include a rearrangement of messages between parties. The modified SDKG protocol provides a 3-pass implementation without relying on random OLE or vector OLE. In further detail, the second party $P_2$ initiates the SDKG protocol and begins by sampling $u_2 \$ \leftarrow Z_{pq}$ for a suitable, fixed, and public prime q, where G be the base point for the elliptic curve group, defined modulo q. The second party $P_2$ generates a commitment $C_2 = Com(u_2 G)$, samples $b_2$, $\sigma_{3,2} \$ \leftarrow Z_q$, generates $f_2(x) = u_2 + b_2 x$, and computes $\sigma_{2,1} = f_2(2)$, $\sigma_{2,2} = f_2(3)$, and $\sigma_{2,3} = f_2(1)$. The second party $P_2$ also computes $Rec_2 = AES_{\varkappa_2}(\sigma_{3,2}, \sigma_{2,3})$, where $\varkappa_2$ is an AES key that is generated and managed by $P_2$'s TEE. The second party $P_2$ sends $C_2$, $\sigma_{2,1}$ to $P_1$.

The first party $P_1$ samples $u_1 \$ \leftarrow Z_p$, $\sigma_{3,1}$, $b_1 \$ \leftarrow Z_q$, generates $f_1(x) = u_1 + b_1 x$, and computes $\sigma_{1,1} = f_1(2)$, $\sigma_{1,2} = f_1(3)$, and $\sigma_{1,3}=f_1(1)$. The first party $P_1$ computes $Rec_1=\sigma_{3,1}$ and saves it securely. If security is to be based in the integrity of the TEE, then the first party $P_1$ can securely save as $Rec_1=AES_{\varkappa_1}(\sigma_{3,1})$, where $\varkappa_1$ is an AES key generated and managed by $P_1$'s TEE. The first party computes its key share as: $x_1=\sigma_{1,1}+\sigma_{2,1}+\sigma_{3,1}=f_1(2)+f_2(2)+\sigma_{3,1}$, and generates a SS-WE NIZK proof, $\Delta_1$, proving its knowledge of $x_1$. The first party sends $\sigma_{1,2}$, $b_1G$, $u_1G$, $\Delta_1$, $x_1G$ to $P_2$.

The second party $P_2$ verifies that $\sigma_{1,2}G-3b_1G=u_1G$, and confirms the correctness of $\Delta_1$. If satisfied, the second party $P_2$ computes $x_2=\sigma_{1,2}+\sigma_{2,2}+\sigma_{3,2}=f_1(3)+f_2(3)+\sigma_{3,2}$ and generates a SS-WE NIZK proof $\Delta_2$ for its knowledge of $x_2$. The second party $P_2$ sends $\Delta_2$, $x_2G$, $b_2G$, $Rec_2$, $DeCom(C_2)$, $u_2G$ to the first party $P_1$, where DeCom denotes the decommitment string. The first party $P_1$ verifies the correctness of $\Delta_2$ and the consistency of $C_2$, $DeCom(C_2)$ and $u_2G$. The first party $P_1$ proceeds to verify that $\sigma_{2,1}G-2b_2G=u_2G$ and It aborts if any of the checks fail.

Whenever the third party $P_3$ wishes to register for securely signing transactions with the first party $P_1$ in the cryptographic network, the third party $P_3$ can engage in the NIZK protocol, discussed above, to retrieve $Rec$ and $Rec_2$ from $P_1$, and thereafter extract $\sigma_{3,1}$, $\sigma_{2,3}$, $\sigma_{3,2}$, and compute $k_3$.

Figure 3:
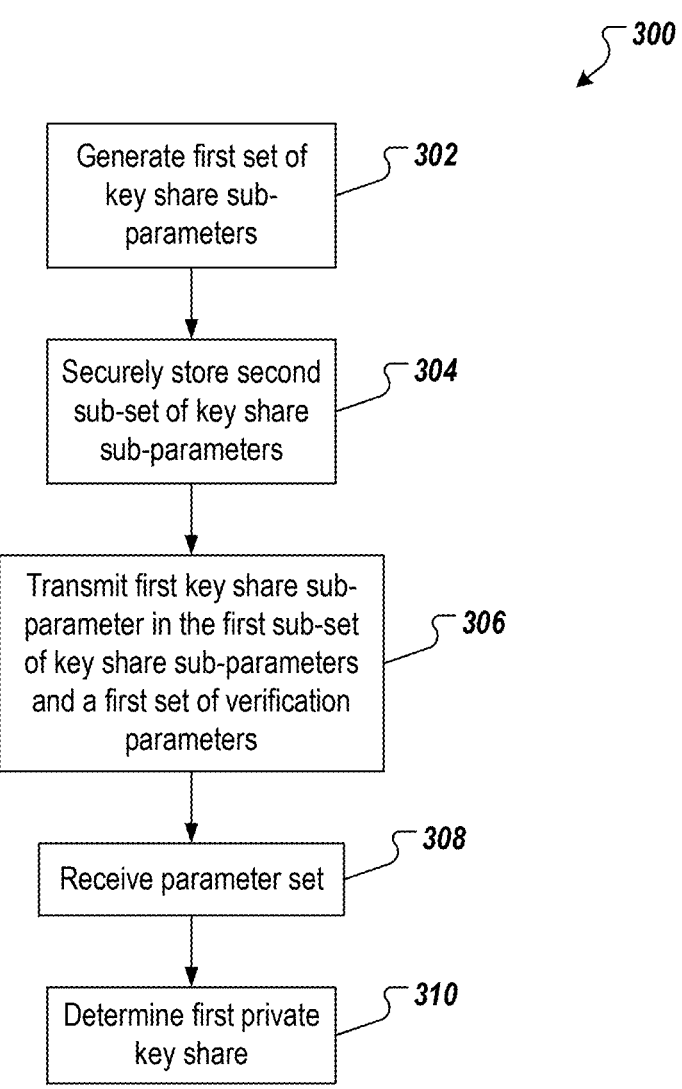
FIG. 3 depicts a flowchart of an example process that can be executed in accordance with implementations of the present disclosure.

FIG. 3 depicts a flowchart of an example process 300 that can be executed in accordance with implementations of the present disclosure. In some examples, the example process 300 is provided using one or more computer-executable programs executed by one or more computing devices.

A first set of key share sub-parameters is generated (302). For example, and as described in detail herein, the first party $P_1$ (e.g., minting entity) generates a first set of key share sub-parameters $[\sigma_{1,1}, \sigma_{1,2}, \sigma_{1,3}, \sigma_{3,1}]$, where a first sub-set of key share sub-parameters $[\sigma_{1,1}, \sigma_{1,2}, \sigma_{1,3}]$ are generated using a first function $[f_1(x)=u_1+b_1x]$ and a second sub-set of key share sub-parameters $[\sigma_{3,1}]$ being generated by sampling from a sampling space. In some implementations, the first party $P_1$ samples $u_1\$\leftarrow Z_p$, $\sigma_{3,1}$, $b_1\$\leftarrow Z_q$ and generates $f_1(x)=u_1+b_1x$. The first party $P_1$ computes $\sigma_{1,1}=f_1(2)$, $\sigma_{1,2}=f_1(3)$, and $\sigma_{1,3}=_1(1)$.

The second sub-set of key share sub-parameters is securely stored (304). For example, and as described in detail herein, the first computing device securely stores the second sub-set of key share sub-parameters $[\sigma_{3,1}]$ by encrypting the second sub-set of key share sub-parameters $[\sigma_{3,1}]$ using a first encryption key $[\varkappa_1]$ to provide an encrypted second sub-set of key share sub-parameters $[Rec_1=AES_{\varkappa_1}(\sigma_{3,1})]$. In some implementations, the first party $P_1$ computes $Rec_1=\sigma_{3,1}$ and saves it securely. In some examples, security can be based on the integrity of the TEE 130, where the first party $P_1$ can securely save as $Rec_1=AES_{\varkappa_1}(\sigma_{3,1})$, where $\varkappa_1$ is an AES key generated and managed by the TEE 130 of the first party $P_1$.

A first key share sub-parameter in the first sub-set of key share sub-parameters and a first set of verification parameters are transmitted (306). For example, and as described herein, the first computing device transmits the first key share sub-parameter $[\sigma_{1,2}]$ in the first sub-set of key share sub-parameters and the first set of verification parameters $[b_1G, u_1G]$ to a second computing device of a second entity. In some implementations, the first party $P_1$ sends $\sigma_{1,2}$, $b_1G$, and $u_1G$ to the second party $P_2$.

A parameter set is received (308). For example, and as described herein, the first computing device receives a parameter set $[\Delta_2, x_2G, \sigma_{2,1}, b_2G, Rec_2, DeCom(C_2), u_2G]$ from the second computing device. In some examples, the parameter set includes a key share sub-parameter $[\sigma_{2,1}]$ generated by the second computing device using a second function $[f_2(x)=u_2+b_2x]$ and a second set of verification parameters $[\Delta_2, x_2G, b_2G, u_2G]$. In some implementations, the second party $P_2$ samples $b_2$, $\sigma_{3,2}\$\leftarrow Z_q$ and generates $f_2(x)=u_2+b_2x$. The second party $P_2$ computes $\sigma_{2,1}=f_2(2)$, $\sigma_{2,2}=f_2(3)$, $\sigma_{2,3}=f_2(1)$, and $Rec_2=AES_{\varkappa_2}(\sigma_{3,2}, \sigma_{2,3})$, where $\varkappa_2$ is an AES key generated and managed by the TEE 132a of the second party $P_2$. The second party $P_2$ computes a private key share parameter $x_2=\sigma_{1,2}+\sigma_{2,2}+\sigma_{3,2}$ and generates a proof $\Delta_2$ for its knowledge of $x_2$. The second party $P_2$ sends (212) $\Delta_2$, $x_2G$, $\sigma_{2,1}$, $b_2G$, $Rec_2$, $DeCom(C_2)$, and $u_2G$ to the first party $P_1$, where DeCom denotes a decommitment string.

A first private key share is determined (310). For example, and as described herein, the first computing device determines the first private key share $[k_{1,2}]$ that enables the first computing device to sign transactions associated with the second computing device within the cryptographic network. In some implementations, the first party $P_1$ computes a private key share parameter $x_1=a_{1,1}+a_{2,1}+a_{3,1}$ and the private key share of the first party $P_1$, which is generated by the first party $P_1$ for signing transactions with the second party $P_2$, is $k_{1,2}=3x_1$.

This specification uses the term "configured" in connection with systems and computer program components. For a system of one or more computers to be configured to perform particular operations or actions means that the system has installed thereon software, firmware, hardware, or a combination thereof that, in operation, cause the system to perform the operations or actions. For one or more computer programs to be configured to perform particular operations or actions means that the one or more programs include instructions that, when executed by data processing apparatus, cause the apparatus to perform the operations or actions.

Implementations of the subject matter and the functional operations described in this specification can be realized in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs (i.e., one or more modules of computer program instructions) encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. The program instructions can be encoded on an artificially-generated propagated signal (e.g., a machine-generated electrical, optical, or electromagnetic signal) that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry (e.g., an FPGA (field programmable gate array) or an ASIC (application-specific integrated circuit)). The apparatus can optionally include, in addition to hardware, code that creates an execution environment for computer programs (e.g., code) that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data (e.g., one or more scripts stored in a markup language document) in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry (e.g., a FPGA, an ASIC), or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer can be embedded in another device (e.g., a mobile telephone, a personal digital assistant (PDA), a mobile audio or video player, a game console, a Global Positioning System (GPS) receiver), or a portable storage device (e.g., a universal serial bus (USB) flash drive) to name just a few.

Computer-readable media suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks.

To provide for interaction with a user, implementations of the subject matter described in this specification can be provisioned on a computer having a display device (e.g., a CRT (cathode ray tube) or LCD (liquid crystal display) monitor) for displaying information to the user and a keyboard and a pointing device (e.g., a mouse, a trackball), by which the user can provide input to the computer. Other kinds of devices can be used to provide for interaction with a user as well; for example, feedback provided to the user can be any form of sensory feedback (e.g., visual feedback, auditory feedback, tactile feedback); and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device (e.g., a smartphone that is running a messaging application), and receiving responsive messages from the user in return.

Implementations of the subject matter described in this specification can be realized in a computing system that includes a back-end component (e.g., as a data server) a middleware component (e.g., an application server), and/or a front-end component (e.g., a client computer having a graphical user interface, a web browser, or an app through which a user can interact with implementations of the subject matter described in this specification, or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a user device (e.g., for purposes of displaying data to and receiving user input from a user interacting with the device), which acts as a client. Data generated at the user device (e.g., a result of the user interaction) can be received at the server from the device.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for star distributed key generation (SDKG) between computing devices for private key sharing in cryptographic networks, comprising:

generating, by a first computing device of a first entity, a first set of key share sub-parameters, a first sub-set of key share sub-parameters generated using a first function comprising a linear function, a second sub-set of key share sub-parameters being generated by sampling from a sampling space;

securely storing the second sub-set of key share sub-parameters by encrypting the second sub-set of key share sub-parameters using a first encryption key to provide an encrypted second sub-set of key share sub-parameters;

transmitting, by the first computing device and to a second computing device of a second entity, a first key share sub-parameter in the first sub-set of key share sub-parameters and a first set of verification parameters;

receiving, by the first computing device and from the second computing device, a parameter set comprising a key share sub-parameter generated by the second computing device using a second function and a second set of verification parameters;

determining, by the first computing device, a first private key share that enables the first computing device to sign transactions associated with the second computing device within the cryptographic network; and determining, by the first computing device, a second private key share that enables the first computing device to sign transactions associated with a third computing device within the cryptographic network;

wherein the first computing device determines the second private key share in response to authenticating the third computing device, according to information that the second computing device shared with the third computing device.

2. The computer-implemented method of claim 1, wherein the encrypted second sub-set of key share sub-parameters is stored within a first trusted execution environment (TEE) of the first computing device.

3. The computer-implemented method of claim 2, wherein the first encryption key is an Advanced Encryption Standard (AES) encryption key that is generated by the first TEE of the first computing device.

4. The computer-implemented method of claim 1, wherein neither the second sub-set of key share sub-parameters nor the encrypted second sub-set of key share sub-parameters is shared by the first computing device within any other computing device during execution of the SDKG.

5. The computer-implemented method of claim 1, wherein the parameter set is received by the first computing device at least partly in response to the second computing device verifying verification parameters of the first set of verification parameters.

6. The computer-implemented method of claim 1, wherein the second computing device securely stores the fourth sub-set of key share sub-parameters and at least one key share sub-parameter of the third sub-set of key share sub-parameters by encryption using a second encryption key to provide an encrypted sub-set of the second set of key share sub-parameters.

7. The computer-implemented method of claim 6, wherein the second encryption key is an AES encryption key that is generated by a second TEE of the second computing device.

8. The computer-implemented method of claim 1, wherein the cryptographic network comprises a cryptocurrency network and the first entity is a minting entity that mints tokens of a cryptocurrency within the cryptocurrency network.

* * * * *